United States Patent [19]

Price

[11] Patent Number: 5,241,778
[45] Date of Patent: Sep. 7, 1993

[54] METHOD OF ATTRACTING AND ERADICATING INSECTS COMPRISING ATTRACTING INSECTS TO A HEARTBEAT SOUND

[76] Inventor: Ron D. Price, 150 Campbell, Pasadena, Tex. 77502

[21] Appl. No.: 918,653

[22] Filed: Jul. 22, 1992

[51] Int. Cl.$^5$ .............. A01M 1/02; A01M 1/20; A01M 1/22
[52] U.S. Cl. .................. 43/132.1; 43/124; 43/112
[58] Field of Search ............. 43/124, 132.1, 112

[56] References Cited

U.S. PATENT DOCUMENTS

| | | | |
|---|---|---|---|
| 1,982,123 | 11/1934 | Rittenhouse | 43/112 |
| 2,577,229 | 12/1951 | Carnes | 43/17.1 |
| 2,861,132 | 11/1958 | Kahn et al. | 43/17.1 X |
| 2,977,705 | 4/1961 | Busnel | 43/17.1 |
| 3,137,092 | 6/1964 | Salerno | 446/397 X |
| 3,414,873 | 12/1968 | Richard et al. | |
| 3,937,826 | 2/1976 | Harris | 424/410 X |
| 3,994,282 | 11/1976 | Moulet | 446/397 |
| 4,105,992 | 8/1978 | Luciano | 43/124 |
| 4,168,591 | 9/1979 | Shaw | 43/124 |
| 4,506,473 | 3/1985 | Waters, Jr. | 43/107 |

*Primary Examiner*—Mark Rosenbaum
*Assistant Examiner*—Jeanne M. Elpel
*Attorney, Agent, or Firm*—Browning, Bushman, Anderson & Brookhart

[57] ABSTRACT

A method for attracting and eradicating bloodsucking insects by generating acoustic waves that simulate a human heartbeat to attract the insects to an attractant zone. An acoustic control mechanism is powered by an electrical power source and generates control signals to an acoustic output unit, such as an acoustic speaker. A sensor unit may be provided for detecting the presence of insects within the attractant zone, and a trigger mechanism used for activating an eradication mechanism in response to a signal from the sensor unit.

6 Claims, 1 Drawing Sheet

METHOD OF ATTRACTING AND ERADICATING INSECTS COMPRISING ATTRACTING INSECTS TO A HEARTBEAT SOUND

FIELD OF THE INVENTION

This invention relates generally to an improved insect attractor and method of attracting insects to a selected site. More particularly, the present invention may be used to attract mosquitos to a selected site, and may be combined with conventional equipment and techniques to kill the insects drawn to that site.

BACKGROUND OF THE INVENTION

The control of insects has been a problem long before mankind conceived of a patent system. While segments of the world are burdened with significant insect control problems from a variety of insect types, many of the world's most populated centers have found it particularly difficult to control the mosquito population. In the United States, for example, monies may not be expended in certain locations to control flies, but it is known that effective control of the food supply for flies in metropolitan areas will significantly reduce the nuisance caused by this insect. As increased emphasis is place on outdoor recreation, more effective methods are required for controlling the types of insects most commonly encountered by the largest number of people. One of the more troublesome, if not the most troublesome, insect that people desire to control is the mosquito. A great deal of effort is expended annually by municipalities to combat the high mosquito population, but these efforts seem to have limited benefits. As increased emphasis is placed on outdoor recreation, more effective methods of controlling mosquitos are required. Within the past decade, there is also increased medical evidence that certain species of mosquitos carry and transmit to humans a variety of diseases.

Various techniques have been proposed for controlling one animal variety, but these techniques have generally been found to be ineffective for other animals. U.S. Pat. No. 4,105,992, for example, discloses a technique utilizing a recording of young rodents to attract mature female rodents to a site, but this technique, even if effective, would not appear to be applicable to controlling insects. Various acoustic attractants have been proposed to attract fish to a lure and/or to a particular fishing site. U.S. Pat. No. 2,577,229 discloses an audible fish lure to produce a sound simulating insects on which the fish feeds. U.S. Pat. No. 2,977,705 discloses an acoustic fish attractant for carnivorous fish. U.S. Pat. No. 3,414,873 discloses another fish attractant that simulates turbulence and vibratory sounds generating by injured or struggling fish to attract predatory fish. None of these patents would appear, however, to provide any teaching with respect to an effective technique to control the insect population.

Probably the most widely used and one of the oldest insect attractants is based on the concept of attracting insects to a particular site by illumination. Most illumination-based attractant devices kill the attracted insect by electrocution, although other concepts have been successfully used to kill the attracted insects. An early patent disclosing an illumination attractant device is U.S. Pat. No. 1,982,123. While illumination-based insect attractants are quite successful for certain insects, such as beetles and moths, these devices are not particularly useful for attracting mosquitos. U.S. Pat. No. 2,861,132 discloses a technique for attracting various insects, and particularly for attracting mosquitos, based on the sounds of the female gender that attract the male gender. While this technique may be useful for interrupting the life cycle of various insects, it has not been proven successful in controlling the mosquito population. Also, while research has shown that certain species of male mosquitos can become sexually stimulated with a tuning fork pitched to a certain frequency, it is generally known that the female mosquito, not the male mosquito, draws blood from animals and is thus the mosquito that is most desirably controlled. Further information regarding acoustic sounds for sexually exciting a male mosquito are disclosed in Grzimek's *Animal Life Encyclopedia*, Volume 32, page 478.

U.S. Pat. No. 3,937,826 discloses a technique for visually attracting certain insects, such as a fly, in order to kill the attracted insect. This technique has not proven commerically successfully, however, for controlling the mosquito population. U.S. Pat. No. 4,168,591 discloses a technique that utilizes a combination of heat and moisture for attracting insects. While the disclosure of this patent indicates that this technique is applicable to various insects, it particularly suggests that the technique is effective to attract mosquitos. Again, however, this technique has not proven to be commerically successful at attracting insects, and has contributed to the plethora of confusion regarding reasons insects are attracted to humans. U.S. Pat. No. 4,506,473 discloses a technique for attracting blood-sucking insects based upon the release of carbon dioxide. This patent similarly has not proven to be commercially successful at attracting insects, and has further confused the public regarding the basis for the attraction of mosquitos to humans.

In spite of the extensive efforts of individuals and companies to devise a technique for successfully attracting and killing mosquitos, it should be readily apparent that none of the techniques disclosed in the above patents have met with significant commercial success. Most of the effort expended by municipalities to control the mosquito population concerns clean-up efforts and/or the spraying of chemicals on stagnant bodies of water. No matter how much effort is expended in reducing the number of tires, cans, and similar receptacles that have mosquito eggs, it is virtually impossible to eliminate the habitat where mosquito eggs will hatch. Also, it has been shown that at least some species of mosquitos do not require water to successfully serve as the habitat for eggs, and that mosquitos can be hatched from eggs deposited in ground cracks containing very little moisture. Nevertheless, millions of dollars are expended by municipalities to spray storm sewers, ditches, ponds and similar locations with chemicals designed to reduce the mosquito population. While the spraying of these chemicals produces questionable benefits, this spraying technique is expensive, and chemically contaminates the air and/or ground water.

The disadvantages of the prior art are overcome by the present invention, and improved methods and apparatus are hereinafter disclosed for attracting insects to a particular site. According to a preferred embodiment of the invention, mosquitos are attracted to a particular site by acoustic sounds, and the attracted mosquitos are killed with conventional equipment.

SUMMARY OF THE INVENTION

The present invention is based on the concept that insects, and particularly female mosquitos, are attracted to an animal as a food source by the acoustic sounds of the animals's heartbeat. These acoustic signals, which are inaudible to humans spaced any appreciable distance from the subject, are audible to mosquitos, and attract the mosquitos to the subject. While this technique may be applicable to various species of subjects from whom female mosquitos obtain blood, it is known to be a particularly useful and highly effective attractant to mosquitos that thrive on human blood as a food source. Moreover, research has suggested that mosquitos are particularly attracted to the acoustic sounds simulating a human heartbeat operating at an above-normal frequency and/or to the heartbeat of a sick individual. This evidence strongly supports the position that mosquitos are sensitive to and attracted by the acoustic heartbeat of a human, and particularly to a heartbeat including frequencies above 300 cycles per second (cps).

According to the present invention, various apparatus may be used to generate the acoustic signals simulating a human heartbeat, and preferably the higher frequency signals indicative of a sick or aged human. This attracting apparatus may include a conventional sound recording and speaker, although preferably an electro-acoustic device is used to continually generate the desired acoustic waves in a more cost-effective manner. Various equipment and techniques may be used to kill the mosquitos attracted to the selected site. A conventional electrocution device would appear cost-effective, although other techniques, such as a device that periodically releases a poisonous gas, could also be practical.

It is an object of the present invention to provide improved and cost-effective techniques and equipment for attracting mosquitos to a particular site utilizing acoustic sounds simulating an animal's heartbeat. Mosquitos may be attracted to a site for the benefit derived by not having a large mosquito population in an area where people congregate. Alternatively, mosquitos attracted to a site may be killed by various techniques and equipment.

It is a feature of this invention that an insect attractant is based on the generation of sound simulating a human heartbeat and preferably the heartbeat of a weak or aged individual. The acoustic waves generated by the device of the present invention preferably include frequencies between 50 cps and 300 cps, and attract mosquitos to a particular site since the mosquito that is the most bothersome to the public is also the mosquito that is particularly sensitized to obtain blood from an injured or aged human.

The significant advantage of the present invention is that a highly cost-effective and environmentally safe technique is provided to control the insect population, and particularly the population of mosquitos. The technique of the present invention may be employed on a large scale by municipalities to control mosquitos throughout an entire city, or may be employed by an individual to control the mosquito population in a backyard. The device of the present invention can kill attracted mosquito by various techniques and equipment, and is highly portable.

These further objects, features, and advantages of the present invention will become apparent from the following detailed description, wherein reference is made to the figures in the accompanying drawings.

PREFERRED EMBODIMENTS OF THE INVENTION

Figure 1:
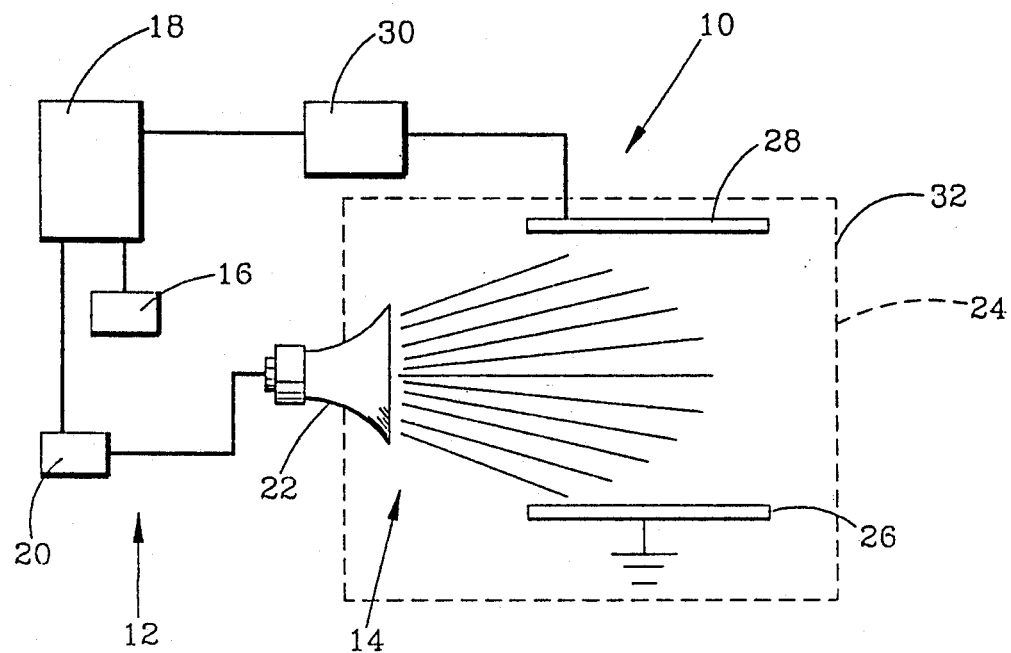
FIG. 1 is a schematic view of an insect attractant and eradication device according to the present invention.

FIG. 1 simplistically depicts an assembly 10 comprising an insect attractant device 12 and an insect eradication device 14 according to the present invention. As previously stated, the device of the present invention has utility as an attractant device without regard to killing or annihilating the insect, since the device may be used to attract insects to one area and thereby keep insects away from an area utilized by humans. Preferably, however, the device of the present invention is used in combination with a device that kills, immobilizes, traps, or otherwise prevents the insect from thereafter biting humans, and such a device may be generally referred to as an insect eradication device. The device of the present invention has utility for various species of insects, particularly including bloodsucking insects such as mosquitos. The invention is specifically described below with respect to its utility for attracting and eradicating mosquitos of the variety that conventionally feed on humans, although modifications to the device will be suggested from the disclosure of this invention that would enable the technique to be reliably used to attract and eradicate mosquitos that feed on any particular animal species.

Referring to FIG. 1, one embodiment of the attractant device comprises an on/off switch 16, an electrical power source 18, a sound recorder 20, and an acoustic speaker 22. The assembly 10 utilizes very little energy, and thus may be activated continually. The attractant device 12 may also be selectively rendered operable by switch 16 and may be activated, for example, for an hour before and during the time interval when children are scheduled to play in a backyard adjacent to the device. Alternatively, a conventional timing circuit (not shown) may be employed to automatically activate the device, for example, between the hours of 5:00 a.m. and 7:00 a.m. and between 5:00 p.m. and 10:30 p.m., when mosquitos are typically active and are generally bothersome to people.

The power source 18 may be an electrical line extending to a conventional 110-volt source, a hydrocarbon fueled generator that outputs electrical power, or a battery source. The portable device according to the present invention, which may be used in generally remote areas, may comprise a photovoltaic panel and a storage battery. Sound recorder 20 may be any type of conventional equipment used to repeatably play back acoustic recordings. A magnetic sound recording tape and tape player may be used, for example, wherein the tape has recorded thereon the acoustic sound simulating a human heartbeat as more specifically described below. More sophisticated sound recording equipment, such as laser disc or CD equipment, may also be utilized.

Speaker 22 provides the acoustic output that attracts the mosquitos. This output may be at a volume and frequency range that is inaudible to humans but that is detected and perceived by mosquitos to be the heartbeat of a human, thereby attracting the mosquitos to the area of the speaker. In view of the particular range of acoustic energy capable of simulating a heartbeat that attracts mosquitos, as discussed below, a relatively low-cost speaker that has a high-quality output to generate this particular range of acoustic energy is preferably utilized. With the device 12 activated, the mosquitos will thus be attracted to the output of the speaker 22. The effective area (or volume area) from which mosquitos are attracted to a particular speaker has yet to be determined, but should depend on the decibel level output of the speaker. Once attracted to a speaker 22, the mosquitos will generally occupy the area (more accurately, the volume or zone) conceptually shown in FIG. 1 to be bounded by dashed lines 24. It has yet to be determined how long attracted mosquitos will remain within zone 24 while acoustic energy is output from the speaker 22. Also, it should be understood that a single switch 16, power source 18, and sound recorder 20 could be used to provide the signals and power any number of spaced-apart speakers 22, each of which attracts mosquitos into its respective attractant zone 24.

The mosquito eradication device 14 shown in FIG. 1 is of the electrocution type. This type of electrocution equipment is conventionally and successfully used, for example, by illumination-type attractant devices. Accordingly, the eradication device 14 is depicted conceptually in FIG. 1, and comprises a ground end plate 26 and a charged plate 28, each spaced adjacent to the edges of attractant zone 24. Plate 28 is supplied with DC power from converter 30, which in turn is connected to power source 18. The charge on plate 28 is normally insufficient to spark across ground plate 26, so that little power is normally consumed to maintain the eradication device activated. When a mosquito enters the zone 24, however, its presence is sufficient to cause electrical plate 28 to spark across to plate 26. During this intermittent sparking action, a mosquito is electrocuted. Conventional protective shielding, such as a wire mesh, may be used to ensure that twigs, birds, and children's fingers do not inadvertently enter the zone 24. Again, more sophisticated electrocution devices may be used to kill the mosquitos. The significant advantage of the present invention is not with respect to the type of eradication device, but rather the attractant device 12 used to attract mosquitos to the zone 24 wherein they may be effectively eradicated.

Figure 2:
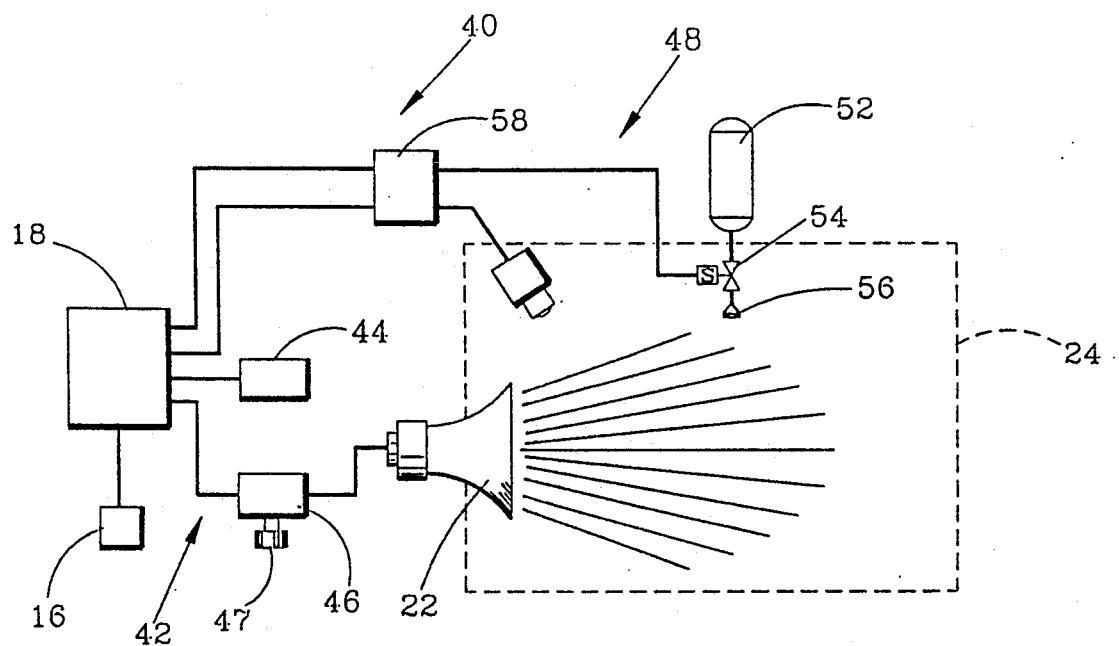
FIG. 2 is an alternative embodiment of an insect attractant and eradication device.

FIG. 2 depicts another embodiment of an attractant and eradication device 40 according to the present invention. The assembly 40 includes attractant device 42 comprising a switch 16, power source 18, and speaker 22 as previously described, and further includes an astatic multivibrator 44 and a differentiating circuit 46. The multivibrator 44 is powered by source 18, and provides a square wave voltage output having a constant period and cycle ratio. Differentiating circuit 46, which is also powered by source 18, generates a time derivative of a square wave voltage output such that the output of circuit 46 is pulses associated with the signal supplied by the multivibrator. The diaphragm of speaker 22 is driven by the pulses from circuit 46 to provide an acoustic wave representative of the human heartbeat. An adjustment knob 47 is provided for selectively varying and "fine tuning" the frequency signals from the acoustic speaker, as explained below.

An alternative eradication unit 48 is depicted in FIG. 2, comprising a sensor 50, toxic gas container 52, solenoid valve 54, spray nozzle 56, and converter 58. Electrically powered sensor 50 periodically scans the zone 24, and generates a signal when one or more mosquitos are present within the zone 24. A triggering signal may then be generated within converter 58 as a result of a mosquito being within the zone 24, or alternatively when a selected number of mosquitos, e.g., six or more, occupy the zone 24. This triggering signal results in the opening of solenoid valve 54, which may be automatically returned to its normally closed position by a spring or other biasing device after a selected period of, for example, two seconds. While valve 54 is briefly open, toxic fluid from container 52 is expelled through spray nozzle 56 into the zone 24, thereby killing or eradicating insects within or adjacent zone 24. The fluid within the container 52 may be of various formulations known to kill or immobilize insects, and particularly mosquitos, or may be of a formulation that confuses insects or prevents them from thereafter being attracted to humans. This toxic formulation need not be hazardous to humans, and may be expelled at a dosage that is lethal to mosquitos within zone 24, but that is neither detected nor harmful to human or pets within the general vicinity of the assembly 40. The attractant devices and eradication devices shown in FIGS. 1 and 2 may be switched from the depicted embodiments. The assembly of the present invention may also comprise an attractant device, as described herein, and a one-way trap constructed of fine mesh screen that kills, immobilizes, or traps insects. A system might be employed to drown attracted mosquitos. As previously noted, the attractant device of this invention has utility apart from being used in conjunction with an eradication device.

Several observations are noteworthy to understand the effectiveness of the technique according to the present invention. Evidence has illustrated that, contrary to public impressions, mosquitos are not drawn to humans by heat of the human body, carbon dioxide output from humans, or their odor. Mosquitos are, in fact, attracted to and obtain blood from reptiles, such as snakes, which are not hot-blooded and obviously have an odor quite dissimilar to humans. Mosquitos also are attracted to weak, sick, or aged people more than to healthy individuals. These people frequently have a heartbeat that generates frequency signals at significantly higher rates than those of healthy individuals. Accordingly, it is believed that while mosquitos will be attracted to an acoustic signal indicative of a healthy individual in the range of from 50 to 120 cps, mosquitos will be strongly attracted to an acoustic signal in excess of 120 cps, and preferably in the range of from about 150 cps to about 350 cps, which represents a damaged heartbeat.

Various equipment may be used to generate acoustic signals representing the human heartbeat. One early disclosure of such equipment is provided in U.S. Pat. No. 3,317,092, and more sophisticated electronic versions of such devices are disclosed in U.S. Pat. No. 3,994,282. It should be pointed out that equipment need not be used to generate the heartbeat, of course, and an actual human heartbeat need only be recorded and then rebroadcast to attract mosquitos. A significant advantage of generating such signals electrically, in the manner similar to that disclosed in U.S. Pat. No. 3,994,282, is the relatively low cost of reproducing acoustic signals representing the heart compared to the cost of recording and repeatedly playing back actual heartbeat acoustic energy. Also, the electrically generated acoustic signals can be more easily altered or fine-tuned either by the equipment manufacturer or, if desired, by the user, so that the particular acoustic signals that are most effective attracting mosquitos of a certain species or within a certain geographical area can be optimized.

The medical profession, and particularly cardiologists, have recognized that the acoustic signals from a heartbeat are not simply the "lub-dub" sounds familiar to lay individuals. More particularly, medical specialists have recognized the significance of the cadence, rhythm, and relationship between particular components of the heart sound, which are medically referred to as the S1, S2, S3, and S4 components of the heartbeat. While each of these component sounds in turn may hae fluctuations functionally dependent upon the respiratory cycle of the individual, the characteristic frequency of these components is not significantly affected by this respiratory cycle. During both inspiration and expiration, the characteristic frequency of the S1 and S2 components for a healthy heart is normally in the range of from 110 cps to 120 cps, while the characteristic frequency of the S3 component is in the range of from 70 cps to 90 cps. The S4 component may be inaudible to humans using a normal stethoscope for a patient less than 50 years old, although there is no reason to believe that the S4 component, which is generally in the range of 50 cps to 70 cps, is not detected by mosquitos. As indicated above, evidence has shown that mosquitos are strongly attracted to individuals with a damaged heartbeat, and the medical profession has studied in depth the timing, configuration, and duration of heart murmurs. While certain murmurs have a relatively low frequency in the range of from 60 cps to 100 cps, heart murmurs more often are in the medium-frequency range of from 100 cps to 250 cps, or are in the high-frequency range of more than 300 cps associated with "blowing."

The above evidence suggests that mosquitos will be attracted to acoustic signals in the range of from 50 cps to 120 cps, and will be strongly attracted to its acoustic signals in the range of from about 150 cps to about 350 cps. Discrete "ejection sounds" or clicks associated with a damaged heart have a frequency in the 160 to 180 cps range, and these clicks also may be a reason that mosquito are particularly attracted individuals with damaged hearts. It is assumed that mosquitos are attracted to sound waves from an acoustic speaker that replicates the sounds of a heartbeat, and thus signals within the frequency range described above would preferably be output from a speaker in accordance with the "lub-dub" rhythm and cadence associated with a heartbeat.

The method of the present invention is suggested by the apparatus disclosure above. The method for attracting bloodsucking insects, such as mosquitos, to an attractant zone comprises generating a source of electrical energy, generating control signals powered by the source of electrical energy, and generating acoustic wavesd simlating a human heartbeat in response to the control signals for attracting insects to an attractant zone. If desired, the insects may be eradicated once attracted to the zone utilizing the techniques described above. The device of this invention requires little if any maintenance, and may be reliably installed and utilized by relatively inexperienced personnel.

Various changes and modifications will become apparent from the foregoing discussion, and are considered within the scope of the invention. Such changes and modifications should be understood as being within the scope of this invention, which is limited only by the claims attached hereto.

What is claimed is:

1. A method of attracting and eradicating insects, comprising:
   providing a source of electrical energy;
   generating electrical control signals from the source of electrical energy;
   generating acoustic waves in response to said control signals simulating a heartbeat to attract the insects to an attractant zone; and
   automatically eradicating insects attracted to the attractant zone.

2. The method as defined in claim 1, further comprising:
   detecting insects within the attractant zone and generating a signal in response thereto;
   activating an eradication mechanism in response to the signal indicative of detected insects.

3. The method as defined in claim 1, wherein the step of automatically eradicating insects comprises:
   electrocuting insects attracted to the attractant zone.

4. The method as defined in claim 1, wherein the step of automatically eradicating insects comprises:
   providing a storage container housing a toxic fluid; and
   intermittently releasing the toxic fluid within the attractant zone.

5. The method as defined in claim 1, wherein the step of generating acoustic waves comprises:
   generating acoustic waves in the range of from 50 cps to 350 cps.

6. The method as defined in claim 5, further comprising:
   selectively adjusting the frequency range of the generated acoustic waves.

* * * * *